Aug. 11, 1936.    F. G. D. MULLER    2,050,448
VALVE
Filed Dec. 7, 1931
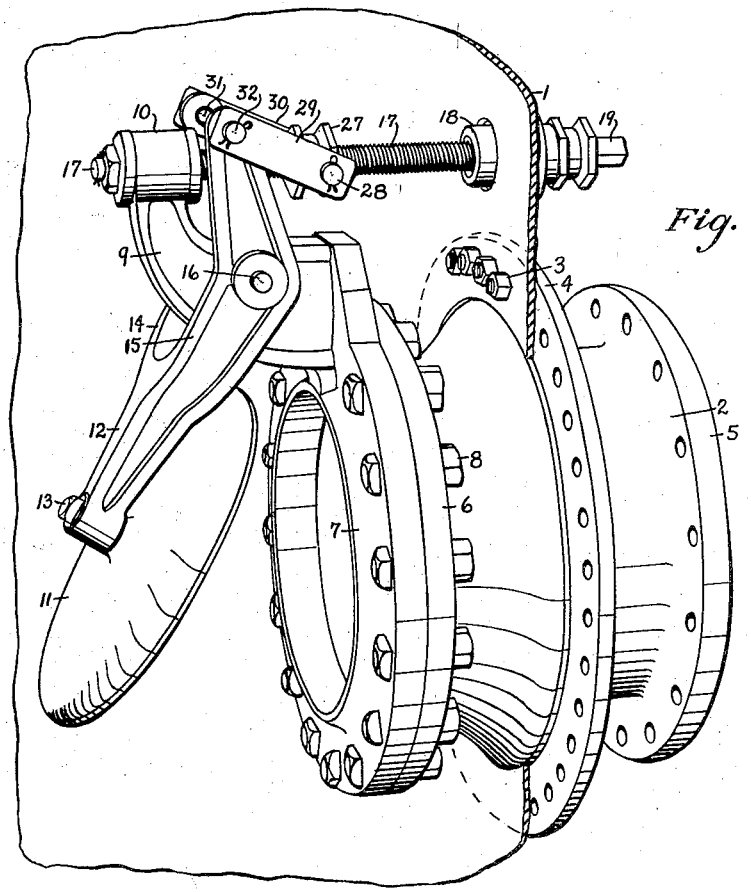
Fig. 1
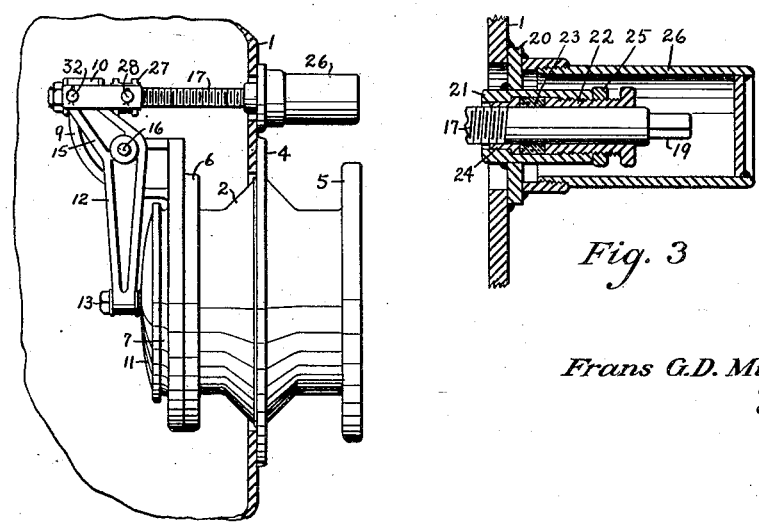
Fig. 2
Fig. 3
Frans G. D. Muller
Inventor
By J. Vincent Martin
Attorney Patented Aug. 11, 1936

2,050,448

UNITED STATES PATENT OFFICE 2,050,448

VALVE

Frans G. D. Muller, Houston, Tex., assignor to The Staytite Company, Houston, Tex., a corporation of Texas Application December 7, 1931, Serial No. 579,412

8 Claims. (Cl. 137—21)

This invention relates to valves.

It has for its general object the provision of a new and improved valve particularly adapted for use in connection with oil tanks and the like. The conventional oil tank has in its lower portion a nozzle through which oil is discharged. Flow pipes are connected to the outer end of this nozzle to convey the oil as desired. When the flow pipes are in need of repair, or the connections thereof are to be altered, the flow of oil through the nozzle is stopped, usually by elevating a swing pipe connected to the inner end of the nozzle. The pressure of the oil upon the nozzle may be thousands of pounds, depending upon the head of the oil and the area of the valve. The present invention provides a new and improved valve that will be held snugly upon its seat, but may be easily opened inwardly against the pressure of the oil without any appreciable strain on the tank.

However, the new and improved device provided by this invention may be used in any apparatus to open or close a valve against a great pressure without appreciably straining the supporting means.

The preferred embodiment of the invention is illustrated in the accompanying drawing, of which Fig. 1 is a perspective view of the valve applied to a tank nozzle and in its open position; Fig. 2, a side elevation of the valve in its closed position; and Fig. 3, a detail of the packing for the actuating bolt.

In the drawing, the shell of the tank is indicated at 1. It has an opening in which the nozzle 2 is secured by the bolts 3 connecting its annular flange 4 to the shell. The nozzle 2 has on its outer end an annular flange 5 by which it may be connected to a suitable flow pipe, not shown.

On its inner end the nozzle 2 has an annular flange 6 to which the valve seat 7 is secured by bolts 8. Integral with the seat 7 is a bracket 9, and carried by the bracket 9 is a thrust bearing 10.

The valve 11 is movably secured to the inner end of a bell crank lever 12 by a central bolt 13. The lever 12 has a pair of arms 14 and 15 extending about the bracket 9 and pivoted thereto, as indicated at 16.

Rotatable in the thrust bearing 10, and thereby held against longitudinal movement, is a bolt 17 that extends outwardly through a packing box 18 in the shell 1, and has a squared end 19 to be gripped by a conventional wrench. As shown by Fig. 3, the packing box may comprise a ring 20 welded to the shell 1 and to a sleeve 21; a gland 22 threaded in the sleeve to compress the packing ring 23; a metal ring 24 to take the thrust on the packing ring 23; a nut 25 to lock the gland 22 in its active position; and a removable casing 26 to shield the parts. The bolt 17 floats in this packing.

Threaded on the bolt 17 is a crosshead 27 to which are pivotally connected as indicated at 28 a pair of links 29 and 30 that are pivotally connected as indicated at 31 and 32 to the arms 14 and 15, respectively, of the lever 12.

It will be apparent that when the bolt 17 is rotated in opposite directions, the crosshead 27, threaded thereon, will be moved toward and away from the thrust bearing 10 and the valve 11 will be moved by the links 29 and 30 and lever 12 toward and away from the seat 7.

As shown by Fig. 2, when the valve 11 is on the seat 7, the pivots 31, 32 and 28 are in alignment with the axis of bolt 17. Therefore, when the bolt is rotated in the thrust bearing 10, the strain on the bolt is entirely longitudinal, and so there are no forces tending to bend the bolt. If these pivot pins were not in alignment with the axis of the bolt, there would be a lateral force as well as a longitudinal force, the former of which would act to bend the bolt. This is important because the valve may be easily opened against a very great pressure without injury to the parts.

As shown by Fig. 1, the pivots 31 and 32 are out of alignment with the axis of the bolt when the valve is partially opened. This is immaterial, however, because as soon as the valve opens, the pressure on each side of the valve is the same and so the strain on the bolt is practically negligible.

Practically, there is no strain on the shell of the tank, as all of the forces required to operate the valve are balanced inside of the actuating mechanism.

It will be understood that the invention is not limited to the use nor to the embodiment herein disclosed.

I claim:

1. A tank having a nozzle; a valve seat on the inner end of said nozzle within said tank; a valve; a bracket connected to said seat; a bell crank lever connected to said valve, and having a pair of arms extending about and pivoted to said bracket; a thrust bearing carried by said bracket; a packing in the shell of said tank; a bolt rotatable in said thrust bearing and extending outwardly through said packing to the exterior of said tank; a crosshead threaded on said bolt between said bearing and said packing; and a pair of connecting links pivoted to the arms of said lever and to said crosshead; the pivots of said links being substantially in alignment with the axis of said bolt when said valve is upon said seat.

2. The combination of a valve; a valve seat; a bracket connected to said seat; a bell crank lever connected to said valve, and having a pair of arms extending about and pivoted to said bracket; a thrust bearing carried by said bracket; a bolt rotatable in said thrust bearing; a crosshead threaded on said bolt; and a pair of connecting links pivoted to the arms of said lever and to said crosshead; the pivots of said links being substantially in alignment with the axis of said bolt when said valve is upon said seat.

3. The combination of a valve; a valve seat; a bracket connected to said seat; a bell crank lever connected to said valve, and having a pair of arms extending about and pivoted to said bracket; a thrust bearing carried by said bracket; a bolt rotatable in said thrust bearing; a crosshead threaded on said bolt; and a pair of connecting links pivoted to the arms of said lever and to said crosshead.

4. The combination of a valve; a valve seat; a bracket connected to said seat; a bell crank lever pivoted to said bracket and connected to said valve; a thrust bearing carried by said bracket; a bolt rotatable in said thrust bearing; a crosshead threaded on said bolt; and a pair of connecting links pivoted to said lever and to the opposite sides of said crosshead; the pivots of said links being substantially in alignment with the axis of said bolt when said valve is upon said seat, so that when said bolt is rotated to move said valve from said seat, the resultant initial strain on said bolt is substantially along its axis.

5. In combination, a fluid holding container having a fluid exit so arranged as to be subject to the head of fluid in the container, a valve seat for said exit, a bracket secured to said seat within said container having a thrust bearing at a point thereon remote from the seat, a valve arranged to engage said seat, a bell crank secured to said valve and pivoted on said bracket between said seat and said bearing, an operating member rotatively secured to said bearing and extending exteriorly of said container, and means connecting said member and said bell crank, said means being so arranged that when opening said valve the head of fluid acting thereon is overcome by said operating member through forces in axial alignment therewith.

6. In combination, a fluid holding container having a fluid exit so arranged as to be subject to the head of fluid in the container, a valve seat for said exit, a bracket secured to said seat within said container having a thrust bearing at a point thereon remote from the seat, a valve arranged to engage said seat, a bifurcated bell crank secured to said valve and pivotally fastened to said bracket between said seat and said bearing, an operating member rotatively secured to said bearing and extending exteriorly of said container, and means connecting said member and the bifurcated end of said bell crank, said means being so arranged that when opening said valve the head of fluid acting thereon is overcome by said operating member through forces in axial alignment therewith.

7. In combination, a fluid holding container having a fluid exit, a ring-like member secured in said exit and forming a valve seat, a thrust bearing and a pivotal mounting secured on said ring-like member and positioned in spaced relation to each other, a valve arranged to engage said seat to close said exit, a lever extending from said valve and pivoted on said pivotal mounting, and an operating member connecting said bearing to said lever at a point spaced from said pivotal mounting, said operating member having a part extending exteriorly of said container by which it may be operated to move said lever by thrust against said bearing in opening said valve.

8. In combination, a fluid holding container having a fluid exit, a ring-like member secured in said exit and forming a valve seat, a thrust bearing and a pivotal mounting secured on said ring-like member and positioned in spaced relation to each other, a valve arranged to engage said seat to close said exit, a lever extending from said valve and pivoted on said pivotal mounting, and an operating member connecting said bearing to said lever at a point spaced from said pivot, said operating member having a part extending exteriorly of said container by which it may be operated to move said lever with respect to said bearing in opening said valve, said parts being so arranged that the initial force exerted by said member in opening said valve will be in axial alignment with said member.

FRANS G. D. MULLER.